United States Patent
Bechtold et al.

(10) Patent No.: US 7,631,438 B2
(45) Date of Patent: Dec. 15, 2009

(54) REVERSING LINEAR DRIVE COMPRISING MEANS FOR DETECTING AN ARMATURE POSITION

(75) Inventors: Mario Bechtold, Hemhofen (DE); Stefan Nunninger, Erlangen (DE); Johannes Reinschke, Nürnberg (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 359 days.

(21) Appl. No.: 10/591,090

(22) PCT Filed: Mar. 3, 2005

(86) PCT No.: PCT/EP2005/050952

§ 371 (c)(1), (2), (4) Date: Jun. 18, 2007

(87) PCT Pub. No.: WO2005/085765

PCT Pub. Date: Sep. 15, 2005

(65) Prior Publication Data

US 2008/0034603 A1 Feb. 14, 2008

(30) Foreign Application Priority Data

Mar. 3, 2004 (DE) .................. 10 2004 010 403

(51) Int. Cl.
*G01B 5/00* (2006.01)
*H02K 33/16* (2006.01)

(52) U.S. Cl. ............................. 33/707; 33/708; 318/135

(58) Field of Classification Search ........... 33/706–708, 33/503, 558–559, 561, 1 M, 1 PT; 318/135, 318/139, 119–121; 417/22, 411

See application file for complete search history.

(56) References Cited

U.S. PATENT DOCUMENTS

| 4,463,300 | A | | 7/1984 | Mayne et al. |
| 5,536,983 | A | * | 7/1996 | Araki et al. .................. 318/135 |
| 5,736,797 | A | * | 4/1998 | Motohashi et al. .......... 318/119 |
| 5,742,136 | A | | 4/1998 | Ono et al. |
| 5,980,211 | A | * | 11/1999 | Tojo et al. ..................... 417/45 |

(Continued)

FOREIGN PATENT DOCUMENTS

DE 100 19 226 10/2001

(Continued)

OTHER PUBLICATIONS

International Search Report PCT/EP2005/050952.

(Continued)

*Primary Examiner*—Yaritza Guadalupe-McCall
(74) *Attorney, Agent, or Firm*—James E. Howard; Andre Pallapies

(57) ABSTRACT

A reversing linear drive which comprises a field coil and a magnetic armature that is excited by the magnetic field of the field coil to perform a linear, axially oscillating movement. In order to detect the armature position, the drive is provided with a stripe pattern element with an alternating arrangement of transparent and opaque stripes or of light-reflecting stripes and non-light-reflecting stripes which extends at least across the entire axial armature stroke, and with a light barrier with elements that emit and receive light in a direction perpendicular to the axial direction.

13 Claims, 4 Drawing Sheets

U.S. PATENT DOCUMENTS

Figure 1:
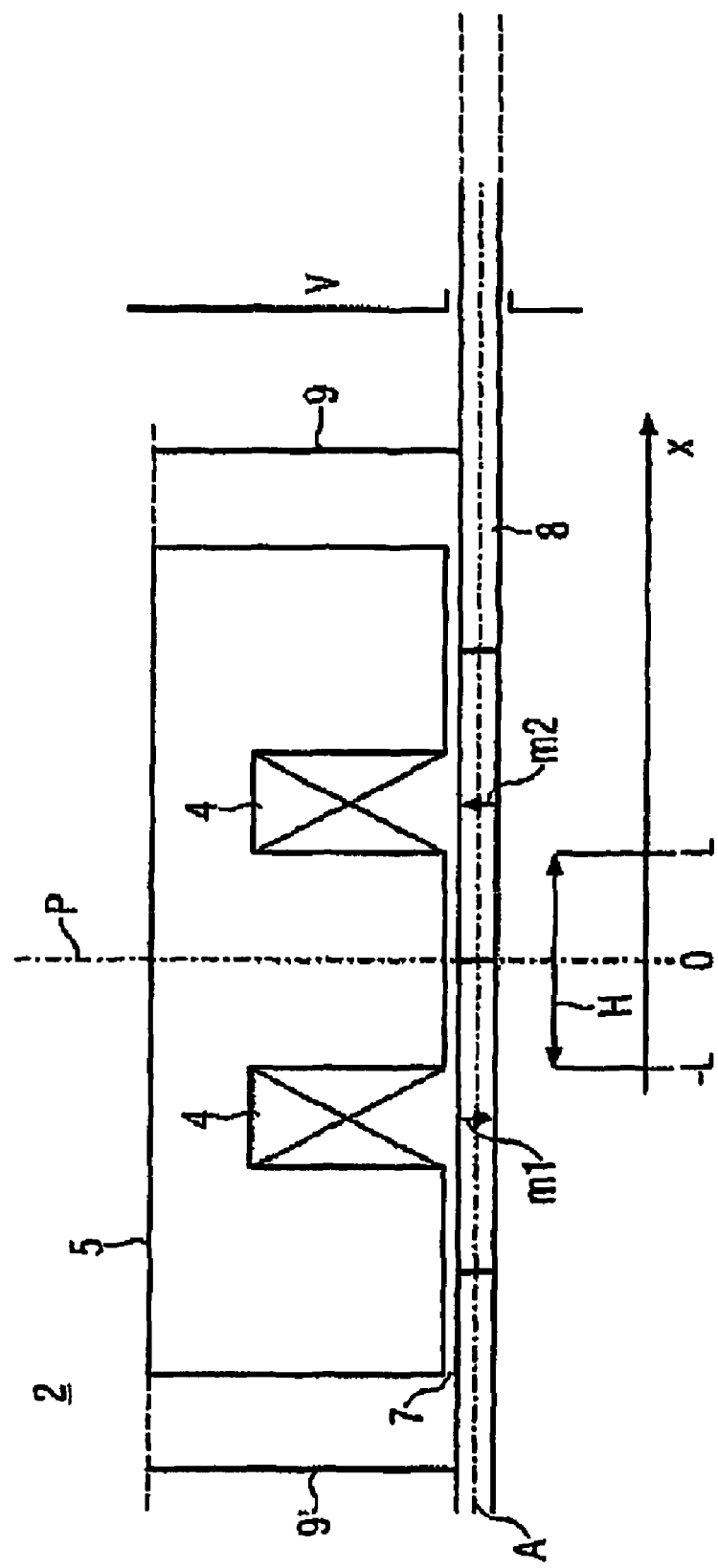

| | | | |
|---|---|---|---|
| 6,182,476 B1 | 2/2001 | Frassi et al. | |
| 6,437,524 B1 * | 8/2002 | Dimanstein | 318/135 |
| 7,184,254 B2 * | 2/2007 | Dimanstein | 417/45 |
| 7,372,221 B2 * | 5/2008 | Reinschke | 318/135 |
| 2003/0059320 A1 * | 3/2003 | Kim et al. | 417/411 |
| 2003/0218854 A1 * | 11/2003 | Dimanstein | 361/187 |
| 2004/0005222 A1 * | 1/2004 | Yoshida et al. | 417/44.11 |
| 2007/0236160 A1 * | 10/2007 | Reinschke | 318/135 |
| 2007/0257562 A1 * | 11/2007 | Reinschke et al. | 310/12 |
| 2009/0153081 A1 * | 6/2009 | Bechtold et al. | 318/128 |

FOREIGN PATENT DOCUMENTS

| | | |
|---|---|---|
| JP | 2002-31054 | 1/2002 |
| RU | 2025035 | 12/1994 |
| SU | 792499 | 12/1980 |
| SU | 1051662 | 10/1983 |
| WO | WO 95/01510 | 1/1995 |

OTHER PUBLICATIONS

Gieras/Piech: Linear Synchronous Motors: Transporation and Automation Systems, CRC-Press, USA, 2000, S. 149-167.

* cited by examiner

REVERSING LINEAR DRIVE COMPRISING MEANS FOR DETECTING AN ARMATURE POSITION

The invention relates to a reversing linear drive
comprising at least one field coil which is to be acted upon by a variable current,
comprising a magnetic armature which is to be set in linear oscillating motion in an axial direction with an armature stroke by the magnetic field of the field coil, and
comprising means for detecting the armature position.

Such a linear drive is deduced from JP 2002-031054 A.

Corresponding linear drives are used in particular to set pump plungers of compressors in linear oscillating vibration. The system comprising such a compressor and linear drive is therefore also designated as a linear compressor (see the JP-A specification cited initially). In corresponding known linear compressors, the armature suspended, for example, by means of at least one spring element such that it can oscillate, forms a spring-mass system designed for a certain oscillation frequency. With its force-distance characteristic, the compressor thus acts to a certain extent like a spring which is, as it were, connected in parallel to the spring used and thus co-determines the characteristic frequency of the system.

In many cases, it is desirable to detect the current, i.e. actual armature position as accurately as possible to control the armature position of such reversing linear drives. Hitherto either the armature position is detected non-continuously, e.g. discontinuously by closing an electrical contact when the armature has reached a certain position. Continuous position measurement is also known, e.g. by means of the voltage induced in the field coil. However, corresponding detections of the armature position are relatively inaccurate.

It is thus the object of the present invention to construct the reversing linear drive provided with the features specified initially such that the respective armature position can be determined with high resolution.

This object is achieved with the features specified in claim 1. Accordingly, the reversing linear drive provided with the features specified initially should be constructed such that its means provided at least to detect the armature position comprise a stripe pattern element extending at least over the entire axial armature stroke comprising an alternating arrangement of transparent and opaque strips or light-reflecting and non-light-reflecting stripes and at least one light barrier comprising light-emitting and light-receiving parts whose light beams are aligned at least approximately perpendicularly relative to the axial direction of the stripe pattern element.

The advantages associated with this embodiment of the linear drive can be seen in particular in that a position measurement and/or a speed measurement of the armature which can be deduced from the position measurement and a time measurement can be made very accurately and very inexpensively using known light barriers. Also the stripe pattern element can be produced by printing technology, for example, in the fashion of a "bar code", very cost effectively and with sufficient precision. The precise and continuous measurement of the armature precision then allows the armature position of a linear compressor, for example, to be regulated more accurately and contributes towards better efficiency of this compressor. Moreover, the position measurement additionally allows greater tolerances in the manufacture since the absolute position of an upper dead-centre point of the armature stroke relative to a reference mark can be measured with minimal additional expenditure and, for example, can be stored in a motor controller.

Advantageous embodiments of the reversing linear drive according to the invention are obtained from the dependent claims. In this case, the embodiment according to claim 1 can be combined with the features of one of the dependent claims or preferably with those of several dependent claims. Accordingly, the following features can additionally be provided for the linear drive:

The stripe pattern element can appropriately be rigidly connected to the armature. Optionally, however, it is also possible that the at least one light barrier is movably arranged with the armature.

In addition, the light barrier can advantageously be embodied as a double light barrier. Such a light barrier can give twice as accurate spatial resolution and reversal of the direction in the armature movement can be detected simply.

Furthermore, the transparent stripes and the opaque strips or the light-reflecting strips and the non-light-reflecting strips can each have the same axial extension. Optionally, however, non-uniform axial extensions of the individual stripes which even vary depending on the axial position are also possible.

In addition or at the same time, the axial extension of the transparent stripes and/or the opaque strips or the light-reflecting strips and/or the non-light-reflecting strips can each be less than 0.25 mm.

The stripe pattern element can be comb-like in particular.

The stripe pattern of the stripe pattern element can particularly advantageously additionally have at least one separately evaluable trigger stripe. This trigger stripe can either be detected by the light barrier provided; instead, it is also possible that a further (single) light barrier is provided for this purpose. In particular, the absolute position of the armature can be calibrated using such a trigger stripe.

Naturally, in addition to the means for detecting the position of the armature, further means can additionally be provided for detecting its speed and/or the direction of movement.

Further advantageous embodiments of the reversible linear drive according to the invention are deduced from the dependent claims which have not been discussed previously and the drawings.

Figure 2:
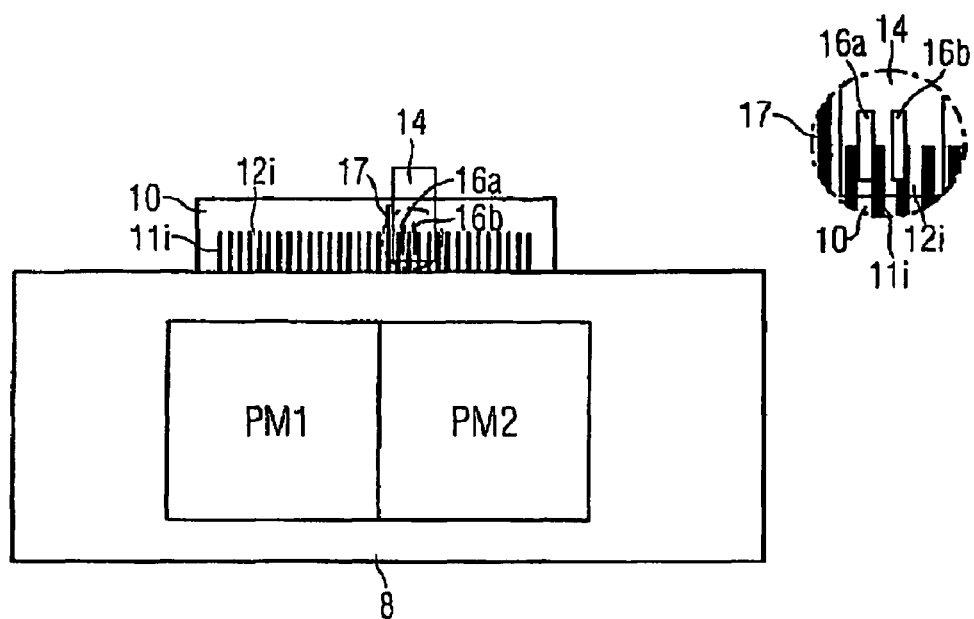
Figure 3:
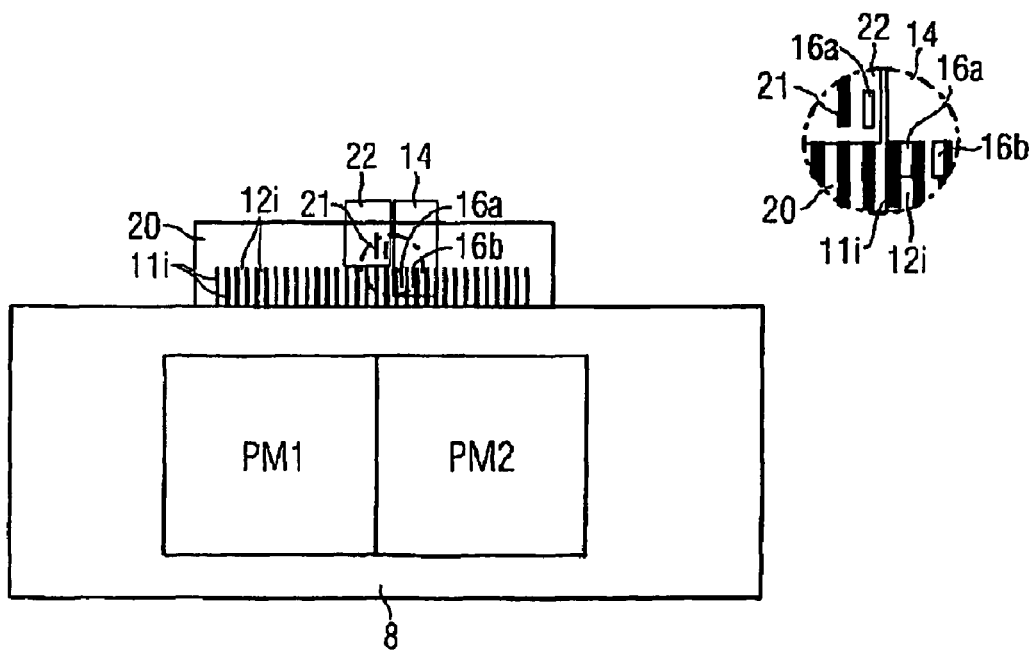
Figure 4:
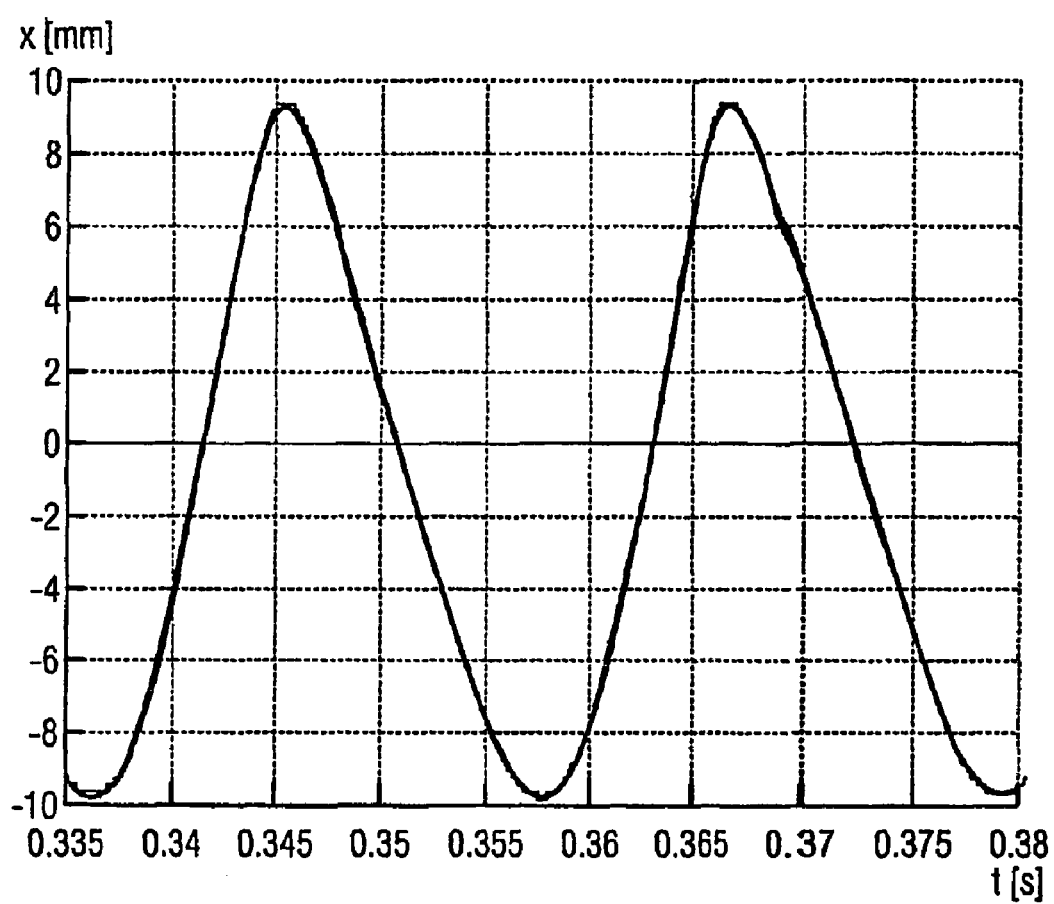
Figure 5:
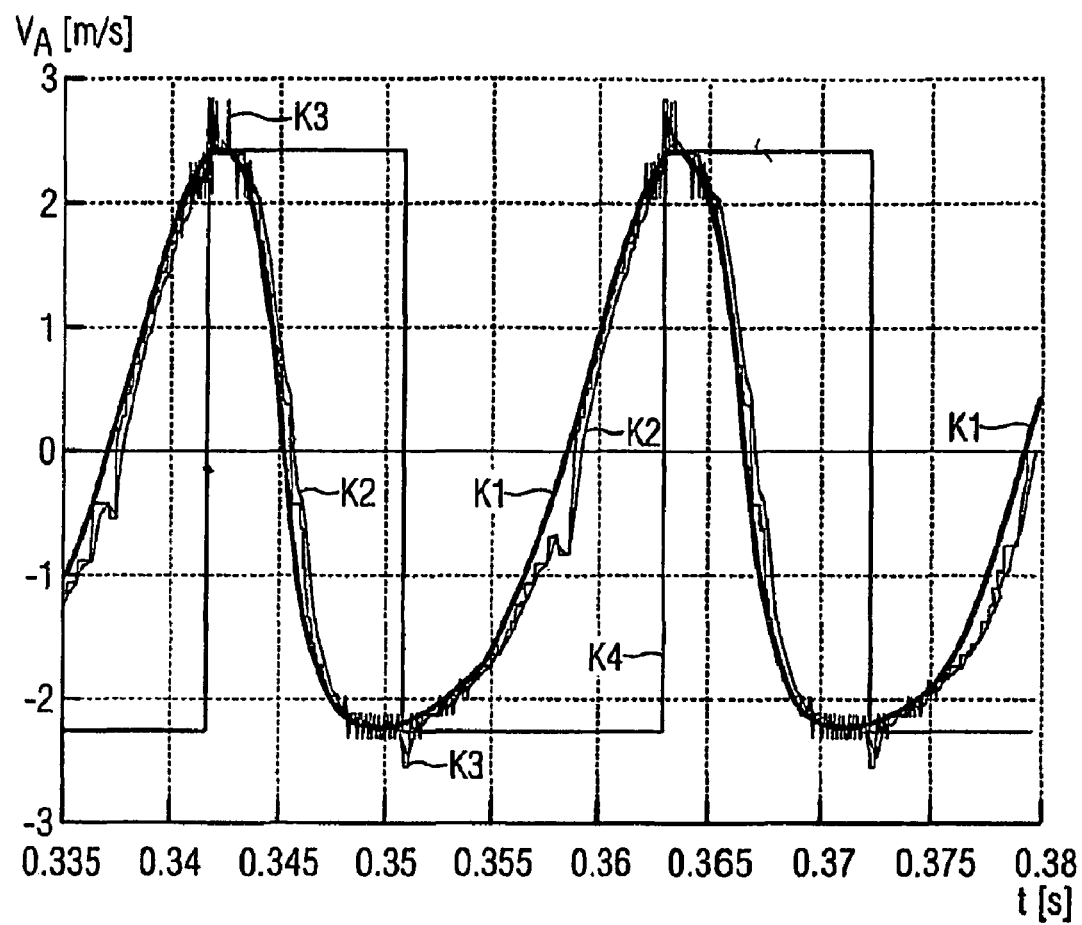

The invention is explained in further detail hereinafter using preferred exemplary embodiments with reference to the drawings. In the figures FIG. 1 is a cross-section through part of a reversing linear drive according to the invention, FIGS. 2 and 3 show two possible embodiments of a double light barrier for such a drive, FIG. 4 is a simulated measurement diagram of a time-dependent armature position measurement using a corresponding double light barrier and FIG. 5 shows a simulated measurement diagram of a time-dependent armature position measurement using a corresponding double light barrier.

In the figures corresponding parts are provided with the same reference numerals.

In the case of the reversible linear drive according to the invention shown in FIG. 1, embodiments known per se are assumed such as those provided for linear compressors (see the JP-A specification mentioned previously). The figures shows schematically substantially only the upper part of a cross-section through such a linear drive 2; i.e. the figure only shows the details located on one side of an axis or plane A which extends in an axial direction of oscillation. Further parts, not shown, are known per se. The linear drive 2 comprises at least one field coil 4 to which at least one magnetic-flux-carrying yoke body 5 is assigned. A magnetic armature or armature portion 8 comprising, for example, two permanent magnets arranged axially one behind the other, is located in a channel-like or slit-like area 7 underneath this yoke body. Its directions of magnetisation are indicated by arrowed lines m1 and m2. The armature not shown in detail, which is also designated as "armature carriage" comprises axially lateral extension parts not described in detail. Said armature can execute an oscillating movement e.g. about a position (marker) P in the variable magnetic field of the coil 4 in the axial direction. For simplicity it is assumed for the diagram in the figure that the oscillation or the position P is executed such that the maximum deflection from this position in the axial direction x, i.e. the oscillation amplitude, is designated with the values +L or −L. The armature stroke would thus be |2.L|. However, it should be borne in mind here that this position P need not be fixed. In particular, during a transient process the position P can deviate significantly from that assumed for an armature movement under normal conditions. That is, the armature oscillation is not generally continuously symmetrical to the position P. If the position P were to be regarded as fixed, in many cases this would not be the same size with regard to positive and negative stroke components.

As is further indicated in the figure, in the selected exemplary embodiment two fixedly clamped leaf springs 9 and 9' on both sides of the position P act on extended parts of the armature 8. Furthermore, on at least one side of the extension part of the armature 8, this can advantageously be rigidly connected to a pump plunger of a compressor V not shown in detail in the figure.

FIG. 2 shows the armature 8 of a linear drive according to the invention comprising two permanent magnets PM1 and PM2. Located on the armature in the form of a "rider" as it were is a stripe pattern element 10 in the form of a light barrier comb, such as is known, for example, from linear optical sensors (see the book "Linear Synchronous Motors: Transportation and Automation Systems" by JF. Gieras & Z. J. Piech, CRC Press, USA, 2000, pages 149 to 167). The stripe pattern element 10 comprises opaque linear stripes 11$i$ and corresponding transparent linear stripes 12$i$ arranged alternately one after the other in the axial direction, which preferably all have the same axial extension or width of in particular less than 0.25 mm. For illustration the stripes 11$i$ are illustrated by black lines and the interposed transparent stripes 12$i$ are illustrated by intermediate spaces which are left light. The arrangement of the transparent and opaque stripes preferably covers at least the entire axial actual stroke H of the armature 8.

The light barrier comb can consist of opaque material and be constructed as mechanically jagged. Alternatively, it consists of a transparent material and is printed with an opaque stripe pattern. If the armature carriage itself consists of transparent material (e.g. GFK which is IR transparent), the light barrier can also be produced by direct printing of the carriage material.

The light barrier comb 10 which moves with the armature 8 passes through a stationary, fixedly installed transmission light barrier 14 whose alternating signal allows a measurement of the position by means of the known period length (=width of two adjacent stripes of which one is transparent and the other is opaque). A double light barrier is selected for the exemplary embodiment although a single light barrier is also suitable. A double light barrier makes it possible to achieve twice as accurate spatial resolution and to detect reversal of the direction of the armature movement. However, corresponding values can also be achieved with a single light barrier, e.g. by refining the stripe pattern and measuring the voltage induced by the armature motion in the field coil which is zero at an armature reversal. The two light beams of the selected transmission double light barrier 14 are aligned perpendicularly with respect to the axial direction and the stripe pattern element 10. In this case, its two light barrier elements 16$a$ and 16$b$ are advantageously positioned axially such that they do not have the same raster size as neighbouring transparent stripes 12$i$ but their centres are spaced further apart than the centres of adjacent stripes. The spatial resolution of the double light barrier 14 is approximately ¼ of the period length of the light barrier comb. In addition, the double light barrier can identify the direction of motion of the armature.

Further information is contained in the transition between light and dark. In addition to the 90° signals, 45° signals are obtained by subtraction or addition of the two light barrier signals whereby the resolution can be increased to ⅛ of the period length. For this purpose, the period length of the stripe pattern should be tuned to the axial spacing of the two light barrier collectors of the double light barrier.

The light barrier comb provided as an embodiment of the stripe pattern element 10 additionally advantageously contains at least one trigger signal stripe 17, e.g. in the form of a longer line. This stripe is preferably arranged at a location where the armature speed is close to its maximum. The trigger signal, which corresponds to a known position, is primarily used to calibrate the position measurement, which is advantageously carried out in each half-wave of the armature movement. Furthermore, the trigger signal as such can advantageously be used in an algorithm for regulating the armature position.

As a result of a semi-overlapping arrangement of the double light barrier 14 according to FIG. 2, the double light barrier can be used directly to evaluate the trigger signal. Since, for example, pairs of LED phototransistors of the transmission light barrier 14 are selected to be geometrically higher than they are wide and are to be arranged vertically so that the normal light barrier comb without trigger stripes is only approximately half-covered, the overrun of the trigger signal stripe can be identified from the signal amplitude delivered by the double light barrier.

The trigger signal is only essentially required during start-up of the motor. A cost-effective variant therefore uses a signal input, e.g. an AD converter which is not necessarily required at the beginning of the start-up, e.g. the input to a current sensor, for evaluating the trigger signal.

Alternatively, the reference marker lies outside the standard operating range. As a result of the standard range being exceeded once during the start-up, the absolute armature position can be detected using the same sensors.

Independent measurement methods such as, for example, an electrical contact measurement on contact with a reference marker can also be used as reference methods. The previously described optical trigger signal could then optionally be dispensed with. If a corresponding reference marker is adjusted to an upper or lower stop or dead-centre point of a load such as a compressor plunger, for example, the coordinate systems of the load and thus the drive can therefore be calibrated.

The light barrier comb can also be formed as non-equidistant with maximal spatial resolution near the armature inversion points and reduced spatial resolution in the area of the maximum armature speed.

A measured value for the armature speed is obtained by time differentiation of the position measured using the light barrier.

Alternatively, this transmissive behaviour can also be constructed as reflective. For this purpose, the stripe pattern element must be provided with reflecting and absorbing stripe patterns. A reflective method has the advantage that stripe patterns can applied to opposite side surfaces of the armature or an associated carrier which are optionally different with regard to stripe width and arrangement. As a result, not only the measurement accuracy can be increased; one side can also be used for a reference measurement.

During start-up during pressure compensation of a compressor coupled mechanically to the linear drive, the plunger stop of this compressor and a further stop on the side facing away from the plunger can be further determined as "soft" by means of a special control. The side facing away from the plunger can be reached in all operating states of the drive and can thus be used as a reference signal independent of the operating state during starting up.

The stripe pattern element with evaluation can furthermore be used during manufacture of the drive to measure the mechanical tolerances in the direction of motion and for functional testing, e.g. measuring the stroke, measuring the stops, optionally also during an external movement.

The embodiment of the armature 8 comprising a stripe pattern element and double light barrier according to FIG. 3 substantially differs from that in FIG. 2 in that a transmitting double light barrier 14 is used which is completely covered by the normal light barrier comb of a stripe pattern element 20 without trigger stripes. The trigger signal produced by a trigger stripe 21 is then identified with an additional transmitting single light barrier 22.

The diagram in FIG. 4 shows the measurement of the armature position x (in mm) depending on the time t (in s) for a specific embodiment of a linear drive.

In a corresponding representation, the diagram in FIG. 5 shows the measurement of the armature speed $v_A$ in m/s) depending on the time t (in s). In the diagram,

K1 is the curve of the real speed,
K2 is the curve of the smoothed light barrier measured value,
K3 is the curve of the light barrier measured speed and
K4 is the speed determined at the trigger time and held thereafter.

Naturally, in addition to the means discussed previously for optical detection of the armature position and derived quantities such as speed and direction of motion, other non-optical means known per se can also additionally be used in a linear drive according to the invention. Thus, for example, the absolute position of the armature can be calibrated by means of an independent different trigger signal, such as, for example, by means of an electrical contact.

In the stripe pattern elements indicated in the figures, it was assumed that these are rigidly connected to the armature carriage and the single or double light barrier is arranged in a fixed position. However, since only the relative movement between these parts is important, the light barrier could also be located on the armature carriage with a fixed stripe pattern element or otherwise movably.

REFERENCE LIST

2 Linear drive
4 Field coil
5 Yoke body
7 Slit-like area
8 Armature
9, 9' Springs
10 Stripe pattern element
11$i$ Opaque stripes
12$i$ Transparent stripes
14 Light barrier
16$a$, 16$b$ Light barrier elements
1. Trigger signal stripes
1. Stripe pattern element
21 Trigger signal stripes
22 Light barrier
P Position marker
L Maximum deflection
x Axial direction
H Armature stroke
m1, m2 Direction of magnetisation
V Compressor
PM1,PM2 Permanent magnets
T Time
$v_A$ Velocity
K1, K2, K3, K4 Curves

The invention claimed is:

1. A reversing linear drive comprising at least one field coil which is to be acted upon by a variable current, comprising a magnetic armature which is to be set in linear oscillating motion in an axial direction with an armature stroke by the magnetic field of the field coil and comprising means for detecting the armature position, wherein the means provided at least to detect the armature position comprise a stripe pattern element extending at least over the entire axial armature stroke comprising an alternating arrangement of at least one of transparent and opaque stripes and light-reflecting and non-light-reflecting stripes and at least one light barrier comprising light-emitting and light-receiving parts whose light beams are aligned at least approximately perpendicularly relative to the axial direction of the stripe pattern element.

2. The drive according to claim 1, wherein the stripe pattern element is rigidly connected to the armature.

3. The drive according to claim 1, wherein the light barrier is embodied as a double light barrier.

4. The drive according to claim 1, wherein at least one of the transparent and opaque stripes and the light-reflecting and non-light-reflecting stripes each have the same axial extension.

5. The drive according to claim 1, wherein at least one of the transparent stripes and the opaque stripes and the light-reflecting and non-light-reflecting stripes have non-uniform axial extensions.

6. The drive according to claim 1, wherein the axial extension of at least one of the transparent and opaque stripes and the light-reflecting and non-light-reflecting stripes is less than 0.25 mm in each case.

7. The drive according to claim 1, further comprising a comb-like formation of the stripe pattern element.

8. The drive according to claim 1, wherein the stripe pattern element additionally has at least one trigger stripe.

9. The drive according to claim 8, wherein the trigger stripe is arranged in the area near the maximum speed of the oscillating armature part.

10. The drive according to claim 8, wherein the trigger stripe is also to be detected by the light barrier.

11. The drive according to claim 8, wherein a separate light barrier is associated with the trigger stripe.

12. The drive according to claim 1, wherein means for detecting at least one of the speed of the armature and the direction of motion of the armature are additionally provided.

13. The drive according to claim 1, wherein the armature is rigidly connected to a pump plunger of a compressor.

* * * * *

UNITED STATES PATENT AND TRADEMARK OFFICE
CERTIFICATE OF CORRECTION

PATENT NO. : 7,631,438 B2
APPLICATION NO. : 10/591090
DATED : December 15, 2009
INVENTOR(S) : Bechtold et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 460 days.

Signed and Sealed this

Second Day of November, 2010

David J. Kappos
*Director of the United States Patent and Trademark Office*